United States Patent
Liu

(10) Patent No.: US 8,270,503 B2
(45) Date of Patent: Sep. 18, 2012

(54) DIGITAL RADIO MONDIALE RECEIVER INTEGER CARRIER FREQUENCY OFFSET ESTIMATION

(75) Inventor: Yan Liu, Shen Zhen (CN)

(73) Assignee: Shenzhen STS Microelectronics Co., Ltd., Shenzhen (CN)

( * ) Notice: Subject to any disclaimer, the term of this patent is extended or adjusted under 35 U.S.C. 154(b) by 1209 days.

(21) Appl. No.: 12/079,951

(22) Filed: Mar. 28, 2008

(65) Prior Publication Data

US 2008/0279314 A1    Nov. 13, 2008

(30) Foreign Application Priority Data

Mar. 29, 2007  (CN) .......................... 2007 1 0089046

(51) Int. Cl.
 *H04L 27/28* (2006.01)
(52) U.S. Cl. ........ 375/260; 375/259; 375/262; 375/271; 375/343; 375/349
(58) Field of Classification Search .................. 375/136, 375/147, 259, 260, 261, 268, 269, 271, 279, 375/295, 319, 322, 326, 329, 344–347, 267
See application file for complete search history.

(56) References Cited

U.S. PATENT DOCUMENTS

| | | | | |
|---|---|---|---|---|
| 7,529,179 | B1 * | 5/2009 | Lee et al. ....................... | 370/208 |
| 7,602,852 | B2 * | 10/2009 | Berkeman et al. ............ | 375/260 |
| 8,139,680 | B2 * | 3/2012 | Kleider et al. ................ | 375/316 |
| 2004/0146003 | A1 * | 7/2004 | Schaefer et al. ............. | 370/206 |
| 2005/0036564 | A1 * | 2/2005 | Peter et al. ..................... | 375/260 |
| 2007/0053448 | A1 * | 3/2007 | Schwoerer et al. ........... | 375/260 |
| 2008/0181288 | A1 * | 7/2008 | Wurzbach et al. ............ | 375/224 |
| 2008/0233958 | A1 * | 9/2008 | Robbins et al. ............... | 455/436 |
| 2009/0141697 | A1 * | 6/2009 | Hofmann ...................... | 370/345 |

* cited by examiner

*Primary Examiner* — Hirdepal Singh

(57) ABSTRACT

A method and apparatus for estimating a carrier frequency offset (CFO) in a Digital Radio Mondiale receiver is provided. Orthogonal frequency-division multiplexing (OFDM) demodulation is performed on a received DRM signal to produce OFDM symbols. A cell characteristic in corresponding cells in the OFDM symbols is compared and a carrier index of a frequency pilot cell in the cells is identified based upon the compared cell characteristic. The CFO is estimated based on the identified carrier index of the frequency pilot cell. The ratio of values of the cell characteristic in corresponding cells may be calculated and the frequency pilot cell identified by identifying cells for which the cell characteristic is most nearly equal. The CFO may be estimated by comparing the identified carrier index with an expected carrier index of a frequency pilot cell.

21 Claims, 1 Drawing Sheet

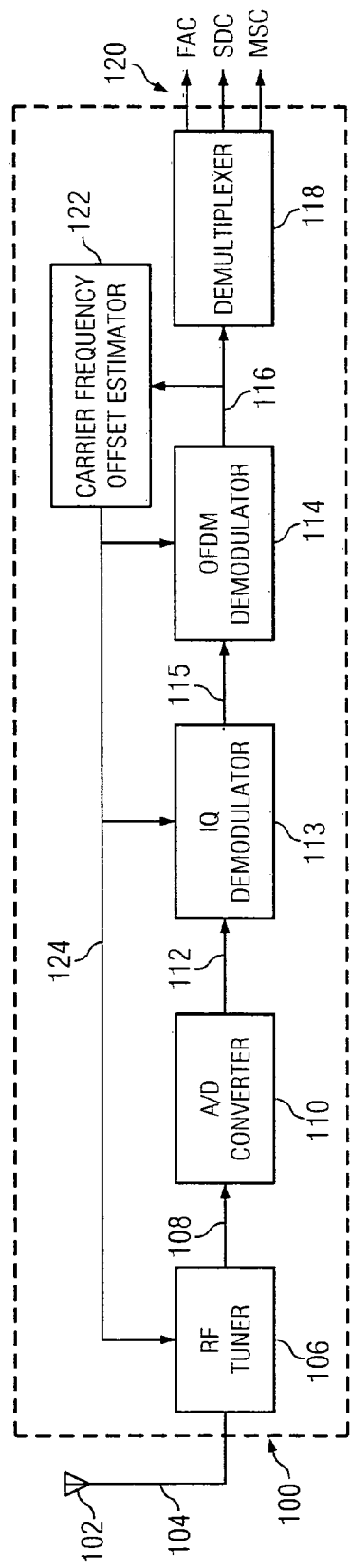
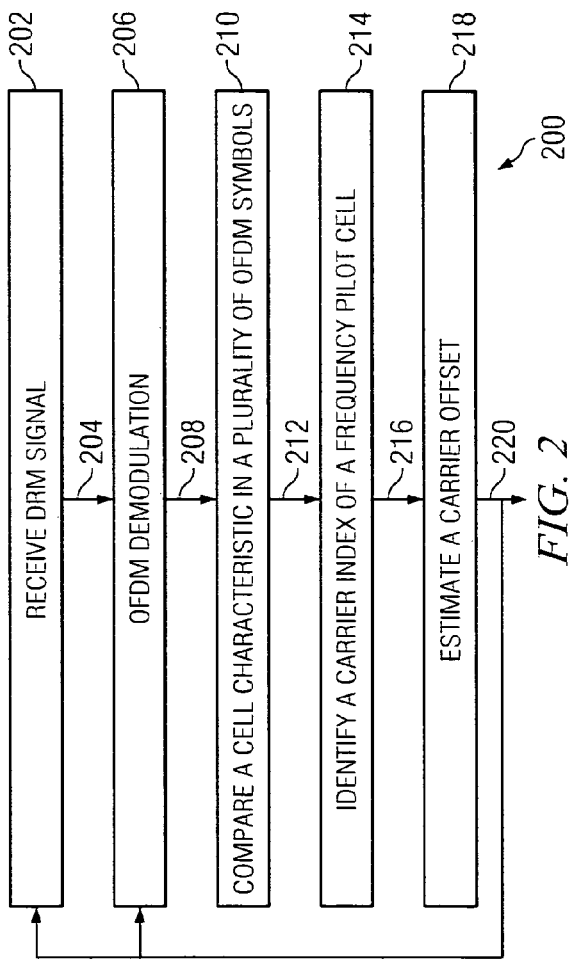

US 8,270,503 B2

DIGITAL RADIO MONDIALE RECEIVER INTEGER CARRIER FREQUENCY OFFSET ESTIMATION

CROSS-REFERENCE TO RELATED APPLICATION AND CLAIM OF PRIORITY

The present application claims the benefit under 35 U.S.C. §119(a) of a Chinese Patent Application filed in the Chinese Intellectual Property Office on Mar. 29, 2007 and assigned Serial No. 2007-10089046.5, the entire disclosure of which is hereby incorporated by reference.

TECHNICAL FIELD

The present disclosure generally relates to Digital Radio Mondiale (DRM) receivers, and more particularly to a method and apparatus for estimating an integer carrier frequency offset in a DRM receiver.

BACKGROUND

Digital Radio Mondiale (DRM) is an open standard digital radio system for short-wave, medium-wave and long-wave communication. Audio source signals are typically encoded into digital signals and may be multiplexed with other digital data for transmission. The multiplexed audio signals and digital data may then be encoded by Quadrature Amplitude Modulation (QAM) to create Main Service Channel (MSC) cells. A Fast Access Channel (FAC) signal that contains information needed to find services and begin decoding the multiplexed signal may also be encoded by QAM to create FSC cells. Furthermore, a Service Description Channel (SDC) signal that provides information to decode services in the DRM transmission and to find alternate sources of data may also be encoded by QAM to create SDC cells.

The MSC, FAC and SDC cells may then be combined and an orthogonal frequency-division multiplexing (OFDM) signal generator used to create OFDM symbols representing the cells. The OFDM symbols may then be used to modulate a radio frequency signal for transmission to DRM receivers.

The DRM standard defines four 'robustness modes' of operation, intended to provide robust transmission under four types of signal propagation conditions. The transmitted DRM signal includes a succession of OFDM symbols, each symbol being made of a guard interval followed by a part of the symbol containing transmitted data. Each symbol is the sum of K sine wave portions (or carriers) equally spaced in frequency. Each sine wave portion, called a "cell", is transmitted with a given amplitude and phase and corresponds to a carrier position. Each carrier is referenced by an index, or number.

The spacing between carrier frequencies and the number of carriers used to transmit a DRM signal are selected based upon a desired robustness mode of the signal and a desired frequency occupancy mode for the signal. The carriers are baseband signals and are used in a DRM transmitter to modulate a reference radio frequency signal.

A transmitted DRM signal is organized into transmission super frames. Each transmission super frame includes three transmission frames. A transmission frame includes a predetermined number of OFDM symbols, transmitted sequentially. The number of OFDM symbols is determined based upon a desired robustness mode, and is different for each mode. Under the DRM standard, a transmission frame may include pilot cells, control cells and data cells. The pilot cells may be used for frame, frequency and time synchronization, channel estimation and robustness mode identification. Pilot cells are selected cells modulated with predetermined phases and amplitudes.

Three frequency reference pilot cells are used by a DRM receiver to detect the presence of a received signal and estimate the signal's frequency offset. Frequency references are located at frequencies which are common to all variations of robustness mode and nominal channel bandwidth. Because the spacing between carrier frequencies varies, depending upon the robustness mode, the three frequency reference frequencies fall on three different carrier indices in each robustness mode. Frequency reference cells are transmitted in every symbol of every transmission frame with gain and phase of constant, known values.

Propagation conditions and lack of synchronization between transmitter oscillators and receiver oscillators may result in a frequency offset in a received DRM signal. The received signal may be offset from the expected reference RF frequency by an amount that is several times the carrier spacing of the transmitted signal. As such, the cells of a received DRM signal may be offset by several carrier indices. The number of carrier indices by which a received signal is offset is referred to as an integer carrier frequency offset.

Previous techniques for synchronizing a DRM receiver to a received signal having a frequency offset have been proposed. They typically require calculating several fast Fourier transforms (FFTs) on the received signal after its conversion from an RF signal to an IF signal. Such techniques will typically calculate multiple FFTs over a segment of received signal that includes several OFDM symbols. However, calculating an FFT is a computationally intensive operation, and calculating multiple FFTs is proportionally more intensive.

There is therefore a need for a technique for synchronizing a DRM receiver that reduces computational complexity. In particular, there is a need for a less computationally intensive technique for estimating a carrier frequency offset in a DRM receiver.

SUMMARY

This disclosure provides a technique for estimating an integer carrier frequency offset in a Digital Radio Mondiale (DRM) receiver that reduces computational complexity.

In one embodiment, the present disclosure provides a method of estimating a carrier frequency offset comprising. The method includes performing orthogonal frequency-division multiplexing (OFDM) demodulation of a received DRM signal to produce OFDM symbols. The method also includes comparing a cell characteristic in corresponding cells in the OFDM symbols and identifying a carrier index of a frequency pilot cell in the cells based upon the comparison of the cell characteristic. The method further includes estimating a carrier frequency offset based on the identified carrier index of the frequency pilot cell. Comparing the cell characteristic may include calculating a ratio of values of the cell characteristic in corresponding cells and identifying the frequency pilot cell may include identifying cells for which the cell characteristic is most nearly equal. Estimating the carrier frequency offset may include comparing the identified carrier index with an expected carrier index of a frequency pilot cell.

In another embodiment, the present disclosure provides a DRM receiver. The receiver includes an OFDM demodulator that is capable of receiving a DRM signal and producing OFDM symbols. The receiver also includes a carrier frequency offset (CFO) estimator that is capable of comparing a cell characteristic in corresponding cells in the OFDM symbols. The CFO estimator is also capable of identifying a carrier index of a frequency pilot cell in the cells based upon the comparison of the cell characteristic. The CFO estimator is further capable of estimating a carrier frequency offset based on the identified carrier index of the frequency pilot cell. The CFO estimator may be capable of calculating a ratio of values of the cell characteristic in corresponding cells and identifying cells for which the cell characteristic is most nearly equal. The CFO estimator may be capable of comparing the identified carrier index with an expected carrier index of a frequency pilot cell.

In yet another embodiment, the present disclosure provides a CFO estimator for use in a DRM receiver. The CFO estimator is adapted to receive a plurality of OFDM symbols and compare a cell characteristic in corresponding cells in the OFDM symbols. The CFO estimator is also adapted to identify a carrier index of a frequency pilot cell in the cells based upon the comparison of the cell characteristic and estimate a carrier frequency offset based on the identified carrier index of the frequency pilot cell. The CFO estimator may be adapted to calculate a ratio of values of the cell characteristic in corresponding cells and identify cells for which the cell characteristic is most nearly equal. The CFO estimator may be adapted to compare the identified carrier index with an expected carrier index of a frequency pilot cell.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which:

FIG. 1 is an exemplary functional block diagram of a Digital Radio Mondiale (DRM) receiver in accordance with one embodiment of the present disclosure; and FIG. 2 shows an exemplary method according to the present disclosure that a DRM receiver may use to synchronize to a received signal.

DETAILED DESCRIPTION

Some embodiments of the present disclosure provide an apparatus and method for integer carrier frequency offset estimation in a Digital Radio Mondiale (DRM) receiver. The method operates after OFDM demodulation of a received DRM signal and is, as a result, less computationally complex than previous methods of estimating integer carrier frequency offset.

Referring now to FIG. 1, a block diagram of a DRM receiver 100 according to the present disclosure is illustrated. An antenna 102 may receive a radio frequency (RF) signal. The antenna 102 may be coupled to an RF tuner 106 by an electrical conductor 104. The RF tuner may convert the RF signal to an intermediate frequency (IF) signal. The RF tuner may be coupled to an analog-to-digital (A/D) converter 110 by an electrical conductor 108 that carries the IF signal. The A/D converter 110 may convert the analog IF signal to a sampled, time domain digital signal. An IQ demodulator 113 may receive the time domain digital signal from the A/D converter 110 via a data link 112. The IQ demodulator 113 may operate to convert the signal into in-phase and quadrature-phase (IQ) baseband signals on a data link 115.

An orthogonal frequency-division multiplexing (OFDM) demodulator may receive the IQ signals on data link 115 and convert them into a plurality of sequentially received, frequency domain, OFDM symbols on data link 116. A demultiplexer 118 may convert the plurality of OFDM symbols into receiver output channels 120. The receiver output channels 120 may include an FAC channel, an SDC channel and an MSC channel.

A carrier frequency offset (CFO) estimator 122 may also receive the plurality of OFDM symbols on the data link 116. The CFO estimator 122 may produce an estimated CFO that may be transmitted to the OFDM demodulator 114, the IQ demodulator 113, or the RF tuner 106 on a data link 124. In one embodiment of the disclosure, the OFDM demodulator 114 may use the estimated CFO to decide phase compensation. In another embodiment, the estimated CFO may be used in the mixer of the IQ demodulator 113. In yet another embodiment, the RF tuner 106 may use the estimated CFO to correct its carrier oscillator.

The plurality of OFDM symbols 116 are sequentially received OFDM symbols. An OFDM symbol includes a plurality of cells, each identified by a carrier index. A cell in one OFDM symbol corresponds to a cell in another OFDM symbol where both cells are identified by the same carrier index. A known number of cells in each symbol will be used as frequency references. The expected carrier indices for the frequency reference cells will also be known. However, due to propagation conditions and lack of synchronization between transmitter oscillators and receiver oscillators, the frequency reference cells may not be found at the expected carrier indices of a received DRM signal. Instead, they may be found in cells offset from the expected carrier indices by a carrier frequency (or carrier index) offset. Absent rapid frequency offset drift, the carrier frequency offset will be the same in subsequent OFDM symbols, or will change slowly over time.

The CFO estimator 122 of the present disclosure operates to identify the carrier indices at which the frequency reference cells are found in a received DRM signal and generated a corresponding carrier frequency offset estimation. Once the CFO estimator 122 transmits an estimated CFO to the OFDM demodulator 114, the IQ demodulator 113, or the RF tuner 106 to synchronize the DRM receiver 100 to an observed carrier frequency offset, it would be expected that the frequency reference cells in subsequent OFDM symbols would be found at, or near, the expected frequency reference carrier indices.

Under the DRM standard, three frequency reference cells are transmitted with the same gain and phase in each OFDM symbol. The gain and phase characteristics of other cells, however, are likely to change in successive symbols and have an even higher probability of changing over a series of symbols. As such, the actual carrier indices of the frequency reference cells in a received DRM signal may be determined by identifying cells whose gain or reference (or both) does not change in two or more OFDM symbols. In one embodiment of the present disclosure this may be done by calculating a ratio of the gain and/or phase characteristics of corresponding cells in two OFDM symbols. Where the ratio is substantially equal to one, the cells are more likely to be frequency reference cells. Where the ratio is substantially equal to one in several pairs of OFDM symbols, there is an even higher probability that the cells are frequency reference cells.

FIG. 2 depicts a method 200 according to the present disclosure that the DRM receiver 100 may use to synchronize to a received signal. In step 202, the DRM receiver 100 may receive a DRM signal and convert the received signal to a time domain digital signal 204. In step 206, the OFDM demodulator 114 may demodulate the time domain digital signal 204 into a plurality of OFDM symbols 208.

The CFO estimator 122 may select a plurality of corresponding cells in two or more of the plurality of OFDM symbols 208 and compare a cell characteristic (such as gain or phase) of the corresponding cells in step 210 to produce a plurality of cell comparisons 212. In step 214, the CFO estimator 122 may examine the plurality of cell comparisons 212 to identify a carrier index 216 of a frequency reference cell. In another embodiment of the present disclosure, the CFO estimator 122 may identify a plurality of carrier indices 216 of a corresponding plurality of frequency reference cells.

Finally, in step 218, the CFO estimator 122 may estimate a carrier frequency offset 220 from the one or more carrier indices 216. This may be done by comparing the carrier indices 216 to expected carrier indices for the frequency reference cells of the OFDM symbols 208. The estimated carrier frequency offset may be used in steps 202 and/or 206 to synchronize the DRM receiver 100 to the frequency offset in the received signal.

In one embodiment of the present disclosure, the operation of the CFO estimator 122 on a single pair of OFDM symbols may be characterized by:

$$\Delta f_{int} = \{\Delta k \mid f(Y_{\Delta k+KpilotF,i}/Y_{\Delta k+KpilotF,i-1}) \qquad 1$$

$$= \max_{K}(f(Y_{\Delta k+KpilotF,i}/Y_{\Delta k+KpilotF,i-1}))\} \text{ for}$$

$$K = \{k \mid -10 \le k \le 10\},$$

where $\Delta f_{int}$ is an estimated integer carrier frequency offset, $Y_{x,i}$ is a characteristic of cell x of OFDM symbol i, KpilotF is an expected frequency reference carrier index, and K is a search range for the carrier frequency offset. While the range [−10,10] is used in Equation 1, other ranges may be used, up to the complete range of carrier indices, based upon an expected stability of the carrier oscillator in the RF tuner 106.

The result of Equation 1, $\Delta f_{int}$, is an integer carrier index offset value. Where a frequency offset is needed to synchronize the DRM receiver, for example in correcting the carrier oscillator of the RF tuner 106, $\Delta f_{int}$ may be multiplied by a carrier frequency interval. A different carrier frequency interval is used in each robustness mode. By determining from the received DRM signal the robustness mode in which the signal is being transmitted, the DRM may determine what carrier frequency interval is being used.

The function f(x) is chosen to have a maximum where its argument has a value of one. Where equation 1 is evaluated concurrently for all three frequency reference cells, the function f(x) is chosen to have a maximum where its argument has a value [1,1,1]—that is, f(x) has a maximum where ‖x−1‖ is at a minimum. An example of such a function $$f(x) \text{ is } f(x) = \frac{1}{k \times \|\|x\| - 1\| + 1}.$$

The accuracy of the estimated integer carrier frequency offset may be improved in another embodiment of the present disclosure by calculating an average of the cell characteristic ratio over more than one pair of OFDM symbols. The operation of the CFO estimator 122 in such an embodiment may be characterized by:

$$\Delta f_{int} = \left\{\Delta k \left| \sum_{i} f(Y_{\Delta k+KpilotF,i}/Y_{\Delta k+KpilotF,i-1}) = \right.\right. \qquad 2$$

$$\left.\max_{K}\left(\sum_{i} f(Y_{\Delta k+KpilotF,i}/Y_{\Delta k+KpilotF,i-1})\right)\right\}.$$

The elements of the DRM receiver 100 according to the present disclosure, including the carrier frequency offset estimator 122, may be implemented in hardware or a combination of hardware and firmware or software (such as a processor, ASIC, FPGA, or other device that operates using software or firmware instructions).

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of estimating a carrier frequency offset in a Digital Radio Mondiale (DRM) receiver, the method comprising:
    performing orthogonal frequency-division multiplexing (OFDM) demodulation of a received DRM signal to produce a plurality of sequential OFDM symbols;
    for each of a plurality of cells within a first of the OFDM symbols and a corresponding plurality of cells within a second of the OFDM symbols, calculating a ratio of a cell gain and/or phase characteristic for a cell within the first of the OFDM symbols is substantially equal to a cell gain and/or phase characteristic in a corresponding cell within the second of the OFDM symbols;
    identifying frequency pilot cells in the first and second OFDM symbols by identifying counterpart cells within the first and second OFDM symbols having cell gain and/or phase characteristic value ratios that are substantially equal to one;
    identifying a carrier index of the frequency pilot cells; and
    estimating the carrier frequency offset based on the identified carrier index of the frequency pilot cell.

2. The method of claim 1, wherein OFDM demodulation is performed based upon the estimated carrier frequency offset.

3. The method of claim 1, further comprising calculating an average of the cell gain and/or phase characteristic values over counterpart cells within more than one pair of OFDM symbols.

4. The method of claim 1, wherein identifying frequency pilot cells comprises identifying two counterpart cells for which the cell gain and/or phase characteristic values are most nearly equal.

5. The method of claim 1, wherein identifying a carrier index of a frequency pilot cell comprises identifying carrier indices of a plurality of frequency pilot cells.

6. The method of claim 1, wherein estimating the carrier frequency offset comprises comparing the identified carrier index of the frequency pilot cell with an expected carrier index of the frequency pilot cell.

7. The method of claim 6, wherein the plurality of cells within the first of the OFDM symbols and the corresponding plurality of cells within the second of the OFDM symbols are selected based upon a selected search range relative to the expected carrier index of the frequency pilot cell.

8. A Digital Radio Mondiale (DRM) receiver, comprising:
an orthogonal frequency-division multiplexing (OFDM) demodulator, capable of receiving a DRM signal and producing a plurality of sequential OFDM symbols; and
a carrier frequency offset (CFO) estimator configured to:
for each of a plurality of cells within a first of the OFDM symbols and a corresponding plurality of cells within a second of the OFDM symbols, calculating a ratio of a cell gain and/or phase characteristic for a cell within the first of the OFDM symbols to a cell gain and/or phase characteristic in a corresponding cell within the second of the OFDM symbols,
identify frequency pilot cells in the first and second OFDM symbols by identifying counterpart cells within the first and second OFDM symbols having cell gain and/or phase characteristic value ratios that are substantially equal to one,
identify a carrier index of the frequency pilot cells, and
estimate carrier frequency offset based on the identified carrier index of the frequency pilot cell.

9. The DRM receiver of claim 8, wherein the OFDM demodulator is configured to produce the plurality of OFDM symbols based upon the estimated carrier frequency offset.

10. The DRM receiver of claim 8, wherein the CFO estimator is configured to calculate an average of the cell gain and/or phase characteristic values over counterpart cells within more than one pair of OFDM symbols.

11. The DRM receiver of claim 8, wherein the CFO estimator is configured to identify two counterpart cells for which the cell gain and/or phase characteristic values are most nearly equal.

12. The DRM receiver of claim 8, wherein the CFO estimator is configured to identify carrier indices of a plurality of frequency pilot cells.

13. The DRM receiver of claim 8, wherein the CFO estimator is configured to compare the identified carrier index of the frequency pilot cell with an expected carrier index of the frequency pilot cell.

14. The DRM receiver of claim 13, wherein the CFO estimator is configured to select the plurality of cells within the first of the OFDM symbols and the corresponding plurality of cells within the second of the OFDM symbols based upon a selected search range relative to the expected carrier index of the frequency pilot cell.

15. A carrier frequency offset (CFO) estimator in a Digital Radio Mondiale (DRM) receiver, the CFO estimator configured to:
receive a plurality of OFDM symbols;
for each of a plurality of cells within a first of the OFDM symbols and a corresponding plurality of cells within a second of the OFDM symbols, calculate a ratio of a cell gain and/or phase characteristic for a cell within the first of the OFDM symbols to a cell gain and/or phase characteristic in a corresponding cell within the second of the OFDM symbols;
identify frequency pilot cells in the first and second OFDM symbols by identifying counterpart cells within the first and second OFDM symbols having cell gain and/or phase characteristic value ratios that are substantially equal to one;
identify a carrier index of the frequency pilot cells; and
estimate a carrier frequency offset based on the identified carrier index of the frequency pilot cell.

16. The CFO estimator of claim 15, wherein the CFO estimator is further configured to transmit the carrier frequency offset to an orthogonal frequency-division multiplexing (OFDM) demodulator.

17. The CFO estimator of claim 15, wherein the CFO estimator is further configured to calculate an average of the cell gain and/or phase characteristic values over counterpart cells within more than one pair of OFDM symbols.

18. The CFO estimator of claim 15, wherein the CFO estimator is further configured to identify two counterpart cells for which the cell gain and/or phase characteristic values are most nearly equal.

19. The CFO estimator of claim 15, wherein the CFO estimator is further configured to identify carrier indices of a plurality of frequency pilot cells.

20. The CFO estimator of claim 15, wherein the CFO estimator is further configured to compare the carrier index of the frequency pilot cell with an expected carrier index of the frequency pilot cell.

21. The CFO estimator of claim 20, wherein the CFO estimator is further configured to select the plurality of cells within the first of the OFDM symbols and the corresponding plurality of cells within the second of the OFDM symbols based upon a selected search range relative to the expected carrier index of the frequency pilot cell.

* * * * *